United States Patent
Giezenaar et al.

(10) Patent No.: US 10,869,487 B2
(45) Date of Patent: Dec. 22, 2020

(54) METHOD AND DEVICE FOR DETACHING AND ENCLOSING THE OUTER END OF THE RECTUM OF A CARCASS

(71) Applicant: HUMBOLDT B.V., Lichtenvoorde (NL)

(72) Inventors: Jaap Bernardus Giezenaar, 's-Heerenberg (NL); Arno Hermanus Maria Ueffing, Groenlo (NL)

(73) Assignee: HUMBOLDT B.V., Lichtenvoorde (NL)

( * ) Notice: Subject to any disclaimer, the term of this patent is extended or adjusted under 35 U.S.C. 154(b) by 231 days.

(21) Appl. No.: 16/305,588

(22) PCT Filed: May 26, 2017

(86) PCT No.: PCT/NL2017/050340
§ 371 (c)(1),
(2) Date: Nov. 29, 2018

(87) PCT Pub. No.: WO2017/209603
PCT Pub. Date: Dec. 7, 2017

(65) Prior Publication Data
US 2020/0323223 A1    Oct. 15, 2020

(30) Foreign Application Priority Data
May 31, 2016  (NL) .................................... 2016862

(51) Int. Cl.
*A22B 5/00*   (2006.01)
*B65H 20/06*  (2006.01)
*B65H 45/00*  (2006.01)

(52) U.S. Cl.
CPC .......... *A22B 5/0094* (2013.01); *A22B 5/0005* (2013.01); *B65H 20/06* (2013.01); *B65H 45/00* (2013.01); *A22B 2005/0011* (2013.01)

(58) Field of Classification Search
CPC ................................ A22B 5/00; A22B 5/0094
(Continued)

(56) References Cited

U.S. PATENT DOCUMENTS 5,494,481 A     2/1996  Anderberg
5,588,905 A *  12/1996  Nightingale ......... A22B 5/0094
                                                   452/176
(Continued)

FOREIGN PATENT DOCUMENTS

CN      1185720 A    6/1998
CN    103651719 A    3/2014
(Continued)

OTHER PUBLICATIONS

International Search Report from PCT Application No. PCT/NL2017/050340, dated Jun. 13, 2017.
(Continued)

*Primary Examiner* — Richard T Price, Jr.
(74) *Attorney, Agent, or Firm* — Workman Nydegger

(57) ABSTRACT

A method for detaching and enclosing an outer end of the rectum of a carcass comprises the processing steps of: releasing the outer end of the rectum; pulling the released outer end of the rectum out of the carcass; placing the pulled out outer end of the rectum onto a sheet of covering material; and positioning the sheet of covering material around the pulled out outer end of the rectum such that the sheet of covering material encloses the outer end of the rectum. A device is provided for detaching and enclosing an outer end of the rectum of a carcass.

16 Claims, 7 Drawing Sheets

(58) Field of Classification Search
USPC .................................................. 452/106–109
See application file for complete search history.

(56) References Cited

U.S. PATENT DOCUMENTS

| | | | | |
|---|---|---|---|---|
| 5,688,164 | A | 11/1997 | Mills et al. | |
| 6,244,949 | B1* | 6/2001 | Moody | A22B 5/0094 |
| | | | | 452/122 |
| 2009/0081935 | A1* | 3/2009 | Forbes | A22B 5/0094 |
| | | | | 452/109 |
| 2016/0183539 | A1* | 6/2016 | Ellis | A22B 5/0005 |
| | | | | 452/117 |
| 2016/0374356 | A1* | 12/2016 | Heurman | F16G 11/105 |
| | | | | 452/106 |
| 2018/0042247 | A1 | 2/2018 | López | |

FOREIGN PATENT DOCUMENTS

| | | |
|---|---|---|
| CN | 203661906 U | 6/2014 |
| EP | 1027829 A1 | 8/2000 |
| ES | 2552852 A1 | 12/2015 |
| FR | 2946502 A1 | 12/2010 |
| WO | 9213458 A1 | 8/1992 |

OTHER PUBLICATIONS

Netherlands Search Report from NL Application No. 2016862, dated Jan. 10, 2017.
Office Action from corresponding CN Application No. 201780034029. 3, dated Aug. 5, 2020.

* cited by examiner

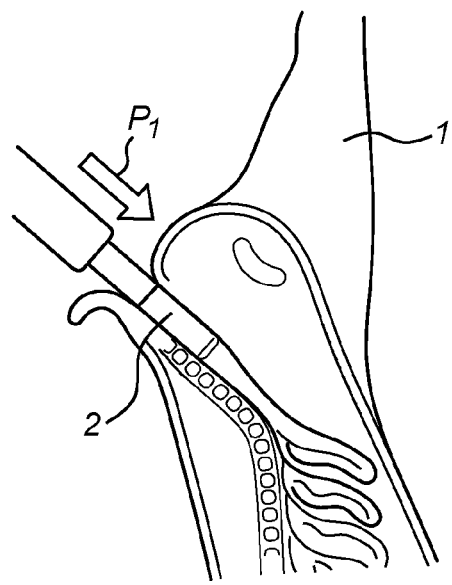
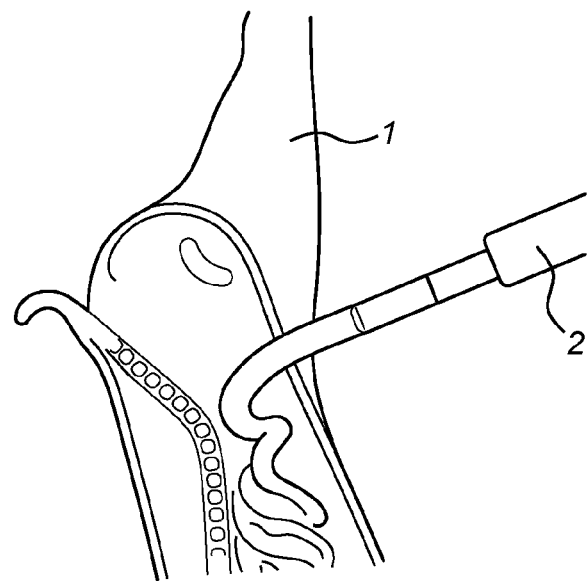
Fig. 1A                         Fig. 1B
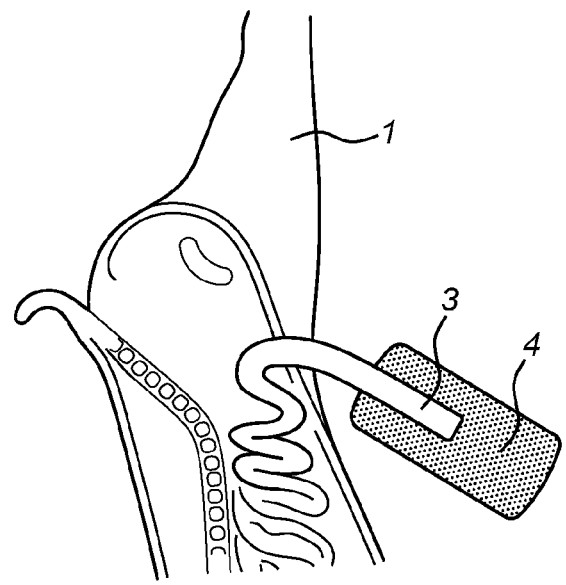
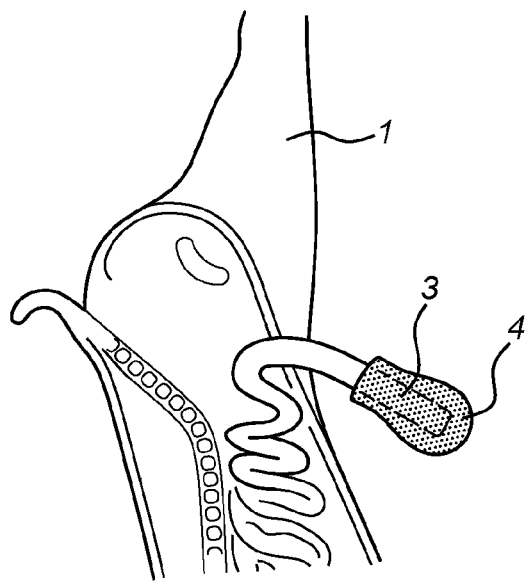
Fig. 1C                         Fig. 1D

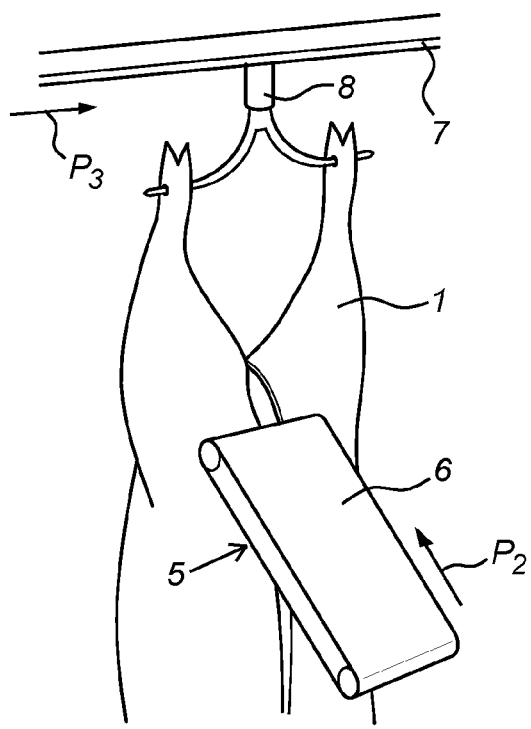
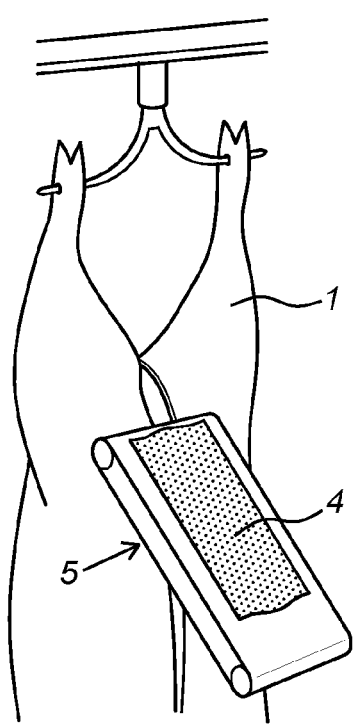
Fig. 2A    Fig. 2B
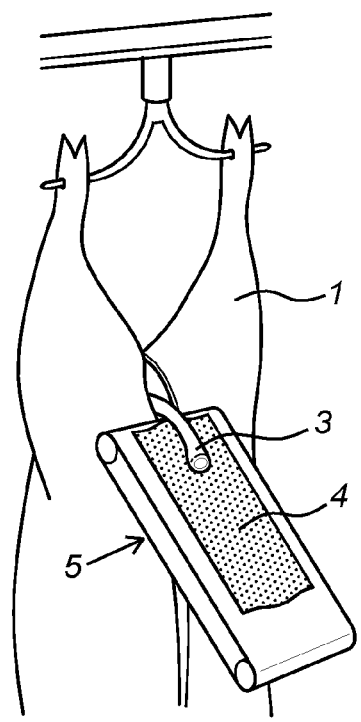
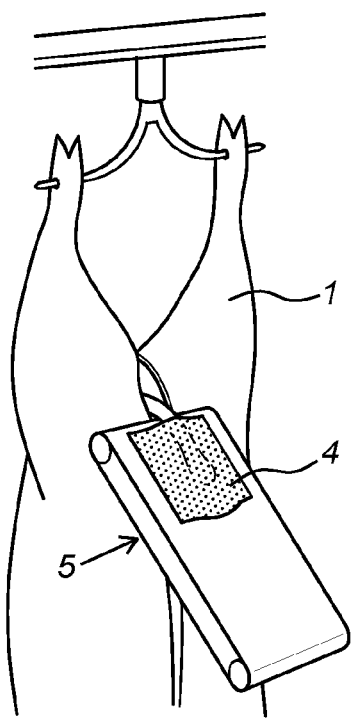
Fig. 2C    Fig. 2D

US 10,869,487 B2

METHOD AND DEVICE FOR DETACHING AND ENCLOSING THE OUTER END OF THE RECTUM OF A CARCASS

BACKGROUND

The invention relates to a method for detaching and enclosing the outer end of the rectum of a carcass, comprising the processing steps of: releasing the outer end of the rectum and pulling the released outer end of the rectum out of the carcass. The invention also relates to a device for detaching and enclosing the outer end of the rectum of a carcass, comprising: a conveyor for carcasses defining a carcass transport path; a tool for releasing the outer end of the rectum of the carcass; and pull-out means for pulling the released outer end of the rectum from the carcass.

During the slaughter of animals, such as pigs in particular, the carcasses of killed animals are suspended in industrial scale processing from a conveyor in order to be carried along a number of processing stations. Examples of such processes are: cleaving of the pubic bone, opening of the belly, detaching of the outer end of the rectum (also referred to as vent cutting), severing of the pizzle, removal of guts and so on. It is of great importance that operations on the carcass have the least possible adverse effect on the quality of the meat. It is thus important to minimize the contact between the contents of the intestines, and particularly of the rectum, and the meat. Because detaching of the outer end of the rectum (the bung) takes place at a position different from the removal of the guts from the carcass, it is desirable to take measures to prevent the content of the severed outer end of the rectum coming into contact with the carcass. In addition, a severed outer end of the rectum must also be prevented from coming into contact with the carcass, since this is also contaminated on the outside by the severing. Existing measures provide for closing of the anus by for instance arranging a plug therein. Yet a further alternative is to manually put a bag around the outer end of the rectum.

The European patent application EP 1 027 829 discloses a method and device for detaching the bung of a carcass wherein the outer end of the rectum is guided at a distance from the carcass by carrying the outer end of the rectum along a guide located at the side of the carcass where the anal orifice is located. During the guiding the guide more or less closes off the outer end of the rectum. Subsequently the outer end of the rectum is manually grasped at some distance of the thickened part (the head) by an operator (slaughterer) to sever the rectum and the gusts connected thereto from the carcass using a knife.

The international patent application WO 92/13458 describes a method and device for mechanized cutting out and removal of the anus of a slaughtered animal, wherein a drilled-out outer end of the rectum is moved in horizontal direction to the ventral side of the carcass, where after the outer end of the rectum is hung over a screening plate to limit the contact between the outer end of the rectum and the carcass.

The present manual techniques for detaching and enclosing the outer end of the rectum of a carcass are often difficult to mechanise and/or are not able to meet the high demands relating the hygiene of the slaughtering process, more precise to prevent the content of the rectum (excrements/dung) to come in contact with the carcass.

SUMMARY

The present invention has for its object to provide an improved method and device for mechanically detaching and enclosing the outer end of the rectum of a carcass with which a carcass can be processed in simple, automated and hygienic manner.

The invention provides for this purpose a method for detaching and enclosing the outer end of the rectum of a carcass, comprising the processing steps of: A) releasing the outer end of the rectum; B) pulling the released outer end of the rectum out of the carcass; C) placing the pulled out outer end of the rectum onto a sheet of covering material; and D) positioning the sheet of covering material around the pulled out outer end of the rectum such that the sheet of covering material encloses the outer end of the rectum. Although already means for covering the outer end of the rectum were know in the prior art as indicated (attaching a bag around the outer end of the rectum) such method demanded manual labour. The subsequent manual handling of plural outer ends of rectums also made that it is not possible to guarantee a hygienic outer end processing. The present invention now provides a method that enables an automatic outer end processing thus making a complex manual manipulation of the outer ends and covering elements superfluous. After releasing (detaching) the outer end of the rectum and pulling the released outer end out of the carcass the outer end may simply be place onto at least one sheet of covering material. This sheet of covering material is subsequently used to cover the outer end of the rectum and thus to prevent further contact with the outer end of the rectum (outside the means for releasing and pulling out the outer end) with the carcass, further process equipment, operators or any other objects in the environment of the outer end of the rectum. This simple method enables a stable, hygienic and economical automatic removal of outer ends of carcasses and also enables simple further processing of the enclosed (covered) outer ends during subsequent processing steps as the enclosed outer ends will not contaminate carcasses or the environment and the enclosed outer ends are free to be handled as desired. The sheet of covering material may comprise a synthetic material, for instance a polyethylene. As an alternative also other materials. Like for instance a cling film may be used. Various types of synthetic sheet materials are easy to provide and are medium tight. A further property of synthetic material is that it may be sealable by heat which property may be used to attach the sheet of covering material around the outer end of the rectum. A specific advantageous property of cling film is that it is easy to adhere around the outer end of the rectum only by folding the foil layer around the outer end of the rectum. However also further alternative sheets of covering material may be applied like for instance multi layered sheets of covering material including a paper layer or other tissue layer. The method may be applied using a single sheet of covering material for enclosing a single outer end of the rectum, however also two or more sheets of covering material may be used in combination for enclosing a single outer end of the rectum. With an alternative method, that is also part of the present invention, the outer end of the rectum may for instance be covered with two sheets of covering material that are brought in contact with the outer end of the rectum from opposite sides.

After the pulled out outer end of the rectum is placed onto the sheet of covering material; and the sheet of covering material is positioned around the pulled out outer end of the rectum so that it encloses the outer end of the rectum the sheet of covering material may be secured in the out outer end of the rectum enclosing position. By securing the sheet of covering material in it enclosing position the sheet will stay in place during subsequent processing steps, thus providing the guarantee that the covered status of the outer end of the rectum will be maintained further in the slaughter line. The securing of the sheet of covering material may be realised by (heat) sealing the sheet in its enclosing position. As an alternative also other sheet adhering methods (like adhesives) may be applied or use may be made of fasteners like for instance elastic bands.

The outer end of the rectum is preferably placed onto the sheet of covering material close to the anal orifice (at a short distance from the pelvic channel), i.e. on the rear side of a carcass close to the rectal area or, as an alternative, on the belly side of the carcass. The drilled-out outer end of the rectum—also referred to as the detached part of the rectum—is generally 10-20 centimetres long and the stretch thereof is such that this enables to place the outer end onto the sheet of covering material. For the releasing of the outer end of the rectum (also referred to as the "bung") use may be made of existing drilling and/or cutting techniques. During the subsequent pulling of the outer end of the rectum out of the carcass one or more connections between rectum and carcass may be broken simultaneously as well. The outer end of the rectum may be pulled out of the carcass by the tool with which the outer end of the rectum is released from the carcass, however the releasing of the outer end of the rectum may alternatively also be realized with another tool that is used for the pulling out. Prior to pulling out the outer end of the rectum in contact with a sheet of covering material the pubic bone may cleaved and the belly may be opened. To further enhance the hygiene it is also possible to clean the outer end of the rectum, e.g. with a cleaning agent such as a disinfectant or steam, before binging the outer end of the rectum in contact with the sheet of covering material.

An important advantage of the present invention is that the process is easy to mechanise and the method may thus be performed without the requirement of manpower. This results in a reduction of the manpower needed in a slaughter line. This is particularly the case when the device according to the invention is applied instead of a device wherein the outer end of the rectum is manually enclosed with for instance a bag.

The sheet of covering material may be supplied onto a carrier, which carrier may be located close to the carcass and during processing step C) the outer end of the rectum may be placed on the sheet of covering material supported by the carrier. The carrier enables an accurate positioning of the sheet of covering material close to the carcass and also may—at least partially—shield off the carcass from the outer end of the rectum in the initial phase before the outer end is covered with the sheet of covering material. The carrier thus also prevents the contamination of the carcass.

The outer end of the rectum may be placed on the sheet of covering material supported by the carrier. When the sheet of covering material is placed on the carrier the allocation (orientation) of this sheet may be well controlled and thus also the contact of the outer end of the rectum and the sheet of covering material may be well controlled. Furthermore the support of the foil layer enables to bring the outer end of the rectum with a force into contact with the sheet of covering material without this leading to displacement of the receiving sheet of covering material.

Furthermore it is possible that after placing the outer end of the rectum on the sheet of covering material the outer end of the rectum may be caught, for instance caught by the carrier such that the sheet of covering material is positioned around the pulled out outer end of the rectum by the carrier. By catching the out end of the rectum (e.g. by bringing or clamping it in a narrowing opening) the position of the outer end of the rectum may be stabilised and the outer end of the rectum may be prevented from returning to a position away from the sheet of covering material. As thus the position of the outer end of the rectum relative to the carrier may be stabilized also the relative position of the outer end of the rectum to the sheet of covering material may be stabilised. In the situation that the sheet of covering material covers the clamping means (e.g. covers a narrowing opening) the sheet of covering material will shield the carrier from contamination of the outer end of the rectum. Additionally the outer end of the rectum may, at a distance from the carcass, be guided along with the movement of the carcass. It is even possible to guide the carrier along with the carcass, but as a simpler alternative it is also possible to maintain the carrier at a stable position along the transport path of the carcasses.

The processing step D) of enclosing the pulled out outer end of the rectum by the sheet of covering material may be realised by applying the sheet of covering material around the outer end of the rectum as a result of folding the sheet of covering material around the outer end of the rectum. To secure the sheet of covering material in the position wherein it encloses the out outer end of the rectum the sheet may be sealed in that position, for instance forming a type of "bag". The sealing may be realised by heat sealing but also other sealing techniques may be applied.

Prior to detaching of the outer end of the rectum of a carcass the processes of cleaving the pubic bone and opening the belly are preferably carried out. This processing sequence also forms part of the application independently of the above described methods. It is also possible to have the process of removing the pizzle or male genital organ take place between cleaving of the pubic bone and opening of the belly. It is also possible to carry out severing of some of the connections between intestine and carcass prior to detaching of the outer end of the rectum.

The present invention also provides a device for detaching and enclosing an outer end of the rectum of a carcass, comprising: a conveyor for carcasses defining a carcass transport path; a tool for releasing the outer end of the rectum of the carcass; and pull-out means for pulling the released outer end of the rectum from the carcass; wherein the device also comprises a sheet of covering material feed and compression means for enclosing the pulled out outer end of the rectum with at least one sheet of covering material. With the device according the invention the advantages as mentioned above in relation to the method according the invention may be realised. By reference these advantages are thus also incorporated here in relation to the device according the invention. With the sheet of covering material feed a sheet of covering material may be provided of which the shape is to be changed by the compression means so that the sheet of covering material in the changed shape encloses the outer end of the rectum.

The device according the invention may also be provided with a guide for the pulled-out and enclosed outer end of the rectum. This guide may be such that it is situated at the side of the carcasses close to the anal orifices or at the belly side of the carcasses. Due to the at least one sheet of covering material enclosed outer end of the rectum the chance that the guide is stained with excrements from the outer end of the rectum is limited. The tool for releasing the outer end of the rectum from the carcass may be a vent cutter, e.g. a rotating vent cutter, and the pull-out means may be integrated with the tool for releasing the outer end of the rectum (e.g. the rotary vent cutter).

The device according the invention may also comprise a sheet of covering material carrier located adjacent the carcass transport path, which sheet of covering material carrier is connected with the sheet of covering material feed. As mentioned above the carrier not only shields the carcass from the outer end of the rectum (limiting contamination of the carcass) but also provides a support for the sheet of covering material enabling a controlled positioning on the at least one sheet of covering material and providing support during the enclosing of the outer end of the rectum. The sheet of covering material feed may be provided with a portioner for subdividing a longer (larger) like for instance a roll of covering material in individual portions (sheets) suited for enclosing an individual outer end of the rectum. The portioner may e.g. be embodied as a heatable wire, for instance in combination with under pressure/suction means. With the suction means the sheet of covering material can be displaced towards the heatable wire. After contacting the sheet of covering material with the heatable wire (in heated condition) the sheet of covering material may be subdivided in parts. A further extension of the device according the invention may be the provision of an automatic exchange for sheet of covering material holders (e.g. coils of sheet of covering material). As mentioned before in relation to the method according the present invention also two or more sheet of covering materials may be combined for enclosing an outer end of the rectum.

The sheet of covering material carrier may also be provided with a catch for the outer end of the rectum. Such a catch may engage the outer end of the rectum such that they are prevented from returning in the direction of their original position in the carcass. The controlled position of the outer end of the rectum thus enable a controlled enclosing with at least one sheet of covering material. The engaging means may be catches, clamps or any other type of fasteners. Furthermore the catch may act directly on the outer end of the rectum but an even cleaner solution is to cover the catch with the sheet of covering material before the outer end of the rectum is caught by the catch. In the latter situation the catch is shielded by the sheet of covering material against contamination. For firm engagement of the outer end of the rectum use may be made of at least two mutually opposite elements placed under a bias directed toward each other. Using such a contraction enables to exert a clamping force on the outer end of the rectum.

The sheet of covering material carrier may be provided with an endless conveyor to enable easy feeding of a new sheet of covering material to a position wherein an outer end of the rectum can be brought in contact with the sheet of covering material. Such an endless conveyor of the sheet of covering material carrier preferably has a transport direction towards the carcass transport path as normally the sheet of covering material has to be fed in a direction towards the carcasses. Furthermore the sheet of covering material carrier may be provided with at least one folding arm, which arm enables automatic enclosing the pulled out outer end of the rectum. As to enable such arm access to the sheet of covering material the endless conveyor may be provided with at least one opening for passage of the folding arm. This folding arm way also be provided with a (heat)seal wire to enable to secure the sheet in its position folded around the outer end of the rectum.

The device may also be provided with cleaning means for cleaning the outer end of the rectum before enclosing it with the sheet of covering material. The danger of contamination of the carcass by the released outer end of the rectum may thus further be limited by cleaning and/or disinfection using for instance a disinfectant like a lactic acid solution or steam.

BRIEF DESCRIPTION OF THE DRAWINGS

The present invention will be further elucidated with reference to the non-limitative embodiments in the following figures. Herein:

FIGS. 1A-1D show schematic the successive stages of the detaching and enclosing an outer end of the rectum of a carcass according the present invention;

FIGS. 2A-2D show schematic views of successive steps of the enclosing of the outer end of the rectum of a carcass according the present invention;

DETAILED DESCRIPTION OF VARIOUS EMBODIMENTS

Figure 3A:
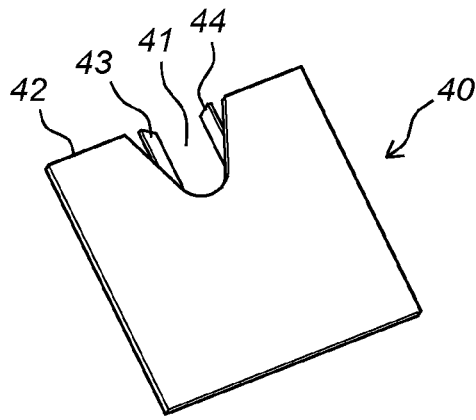
FIGS. 3A-3D show schematic views of successive steps of the enclosing of the outer end of the rectum of a carcass according the present invention as an alternative for the steps shown in FIGS. 2A-2D.
Figure 3B:
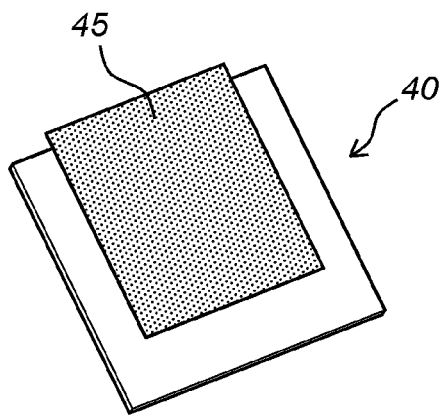
Figure 3C:
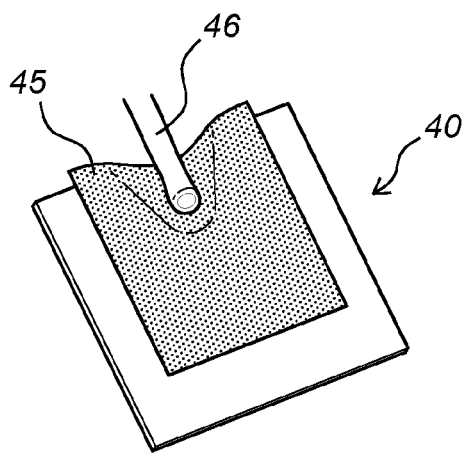
Figure 3D:
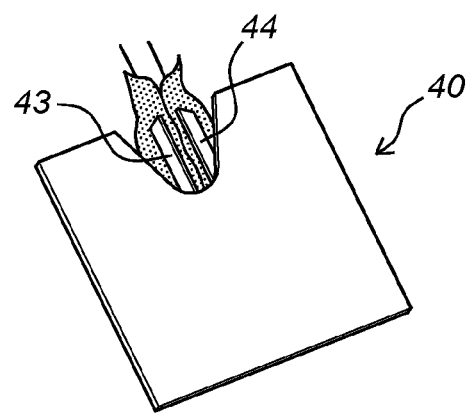

FIG. 1A shows a first processing step wherein an already cleaved and belly opened suspended carcass 1 is approached by a vent cutter 2 (see arrow $P_1$). An outer end of the rectum (not visible here as it is surrounded by the vent cutter 2) is detached. The vent cutter 2 engages on the drilled-out outer end of the rectum (for instance using under-pressure) and as is shown in FIG. 1B the vent cutter 2 pulls the released outer end of the rectum out of the carcass 1. A relatively large pulling force may be exerted on the outer end of the rectum so that it is pulled a greater distance out of the carcass 1 and so that membrane connections between rectum and carcass 1 are broken.

In FIG. 1C is shown that the outer end of the rectum 3 (now visible as the vent cutter is free from the outer end of the rectum 3) is placed onto a sheet of covering material 4 (e.g. a foil layer). And is a subsequent processing step, see FIG. 1D, the outer end of the rectum 3 is enclosed by the sheet of covering material 4.

FIGS. 2A-2D show the use of a sheet of covering material carrier 5, here depicted with and endless conveyor belt 6 for feeding a sheet of covering material towards the carcass 1 (in the direction $P_2$). In FIG. 2A the sheet of covering material carrier 5 is shown in a position close to the carcass 1 that is moved along a transport path defined by a conveyor 7 along which carcasses hanging on a hook 8 are moved (see arrow $P_3$). In FIG. 2B is shown that a sheet of covering material 4 is loaded onto the sheet of covering material carrier 5 and subsequently, as shown in FIG. 2C, the outer end of the rectum 3 is placed onto the sheet of covering material 4 supported by the sheet of covering material carrier 5. In a next step, as illustrated in FIG. 2D, the sheet of covering material 4 is folded around the outer end of the rectum 3 so that it is enclosed and contamination of especially the carcass 1 is prevented.

In the FIGS. 3A-3D an alternative embodiment of the sheet of covering material carrier 40 is show with an aperture 41 on the topside 42. Under the carrier 40 are two moveable clamping beams 43, 44 provided as shown in FIG. 3A that may be used to clamp the sheet of covering material 45 together as it is placed onto the carrier 40 depicted in FIG. 3B. The clamping beams shown in FIG. 3A may also be provided with a sealing heat wire to seal the sheet of covering material 45 after the outer end of the rectum 46 has been placed onto the sheet 45 (see FIG. 3C) and the rectum 46 and the sheet have been pushed downwards into the aperture 41 (for instance by a vent cutter 2 as illustrated in FIG. 1B). After the end of the rectum 46 and a part of the sheet of covering material are pushed into the aperture 41 the clamping beams 43, 44 are moved towards each other (see FIG. 3D) and the clamping beams 43, 44 are subsequently used to seal the sheet 45 in the clamped together position thus enclosing the end of the rectum 46. Afterwards the clamping beams 43, 44 may be moved away from each other so that the sheet enclosed rectum 46 is free for further transportation.

Figure 4:
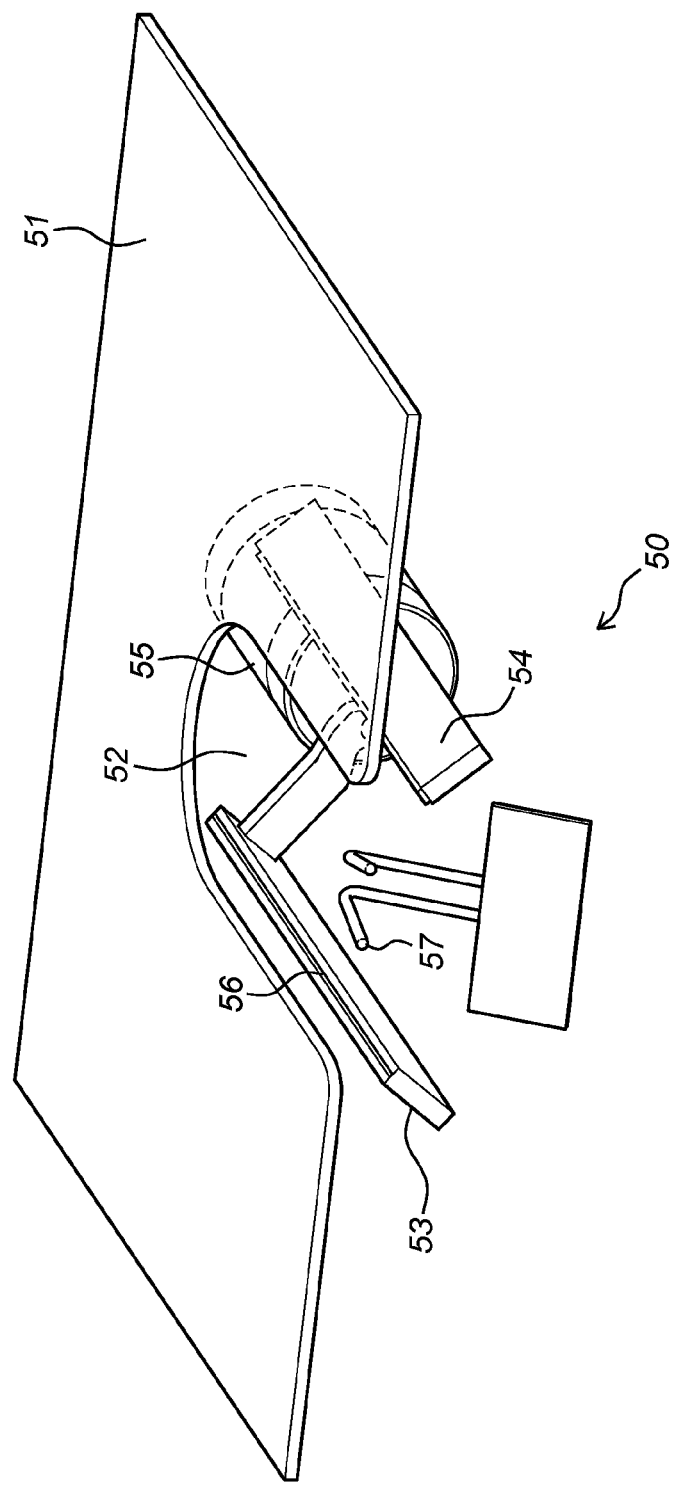
FIG. 4 shows a perspective view of a sheet of covering material carrier.

FIG. 4 shows a sheet of covering material carrier 50 with a sheet contact surface 51 having an edge opening 52. Below the edge opening 52 two clamping sealing beams 53, 54 are located that are moveable towards each other by a drive 55. At least one of the two clamping sealing beams 53, 54 has a heatable wire 56 to enable the beams 53, 54 to seal a sheet when clamped between the two clamping sealing beams 53, 54. For positioning an outer end of the rectum the covering material carrier 50 is also provided with a gripper 57 to prevent the outer end of the rectum to move away during the sheet covering process.

Figure 5A:
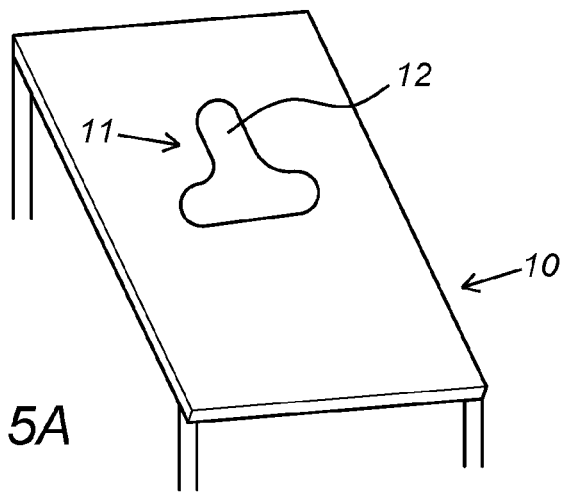
FIGS. 5A-5C show a sheet of covering material carrier that is provided with a catch for the outer end of the rectum during various stages of the detaching and enclosing the outer end of the rectum.
Figure 5B:
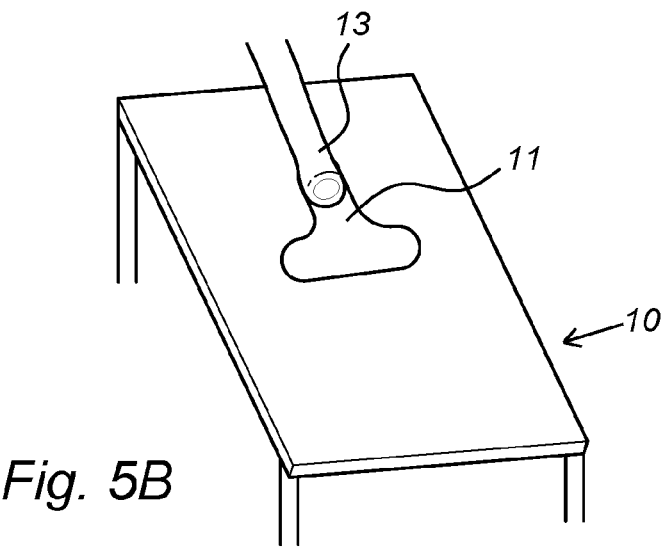
Figure 5C:
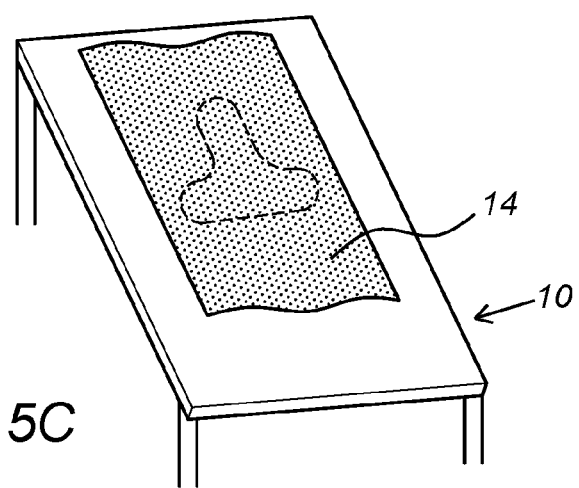

In the FIGS. 5A-5C an alternative sheet of covering material carrier 10 is shown provided with a catch 11, here in the form of a narrowing aperture 12. In FIG. 5B is shown that an outer end of the rectum 13 may be positioned in the catch 11, but preferably—as is shown in FIG. 5C—a sheet of covering material 14 is placed onto the sheet of covering material carrier 10 before the outer end of the rectum 13 is positioned in the catch 11.

Figure 6A:
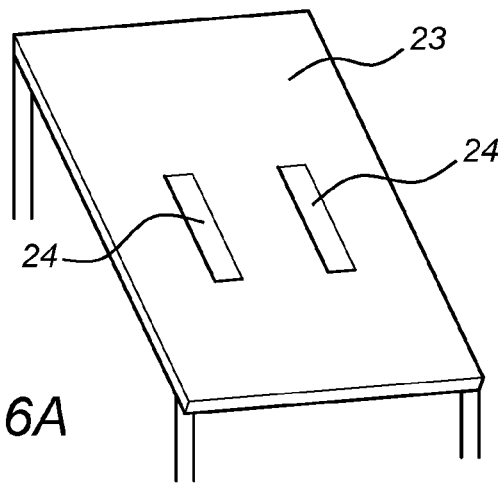
FIGS. 6A-6C show schematic views of successive steps of the enclosing of the outer end of the rectum of a carcass with a sheet of covering material according the present invention wherein arms are used for automatic folding the sheet of covering material around the outer end of the rectum.
Figure 6B:
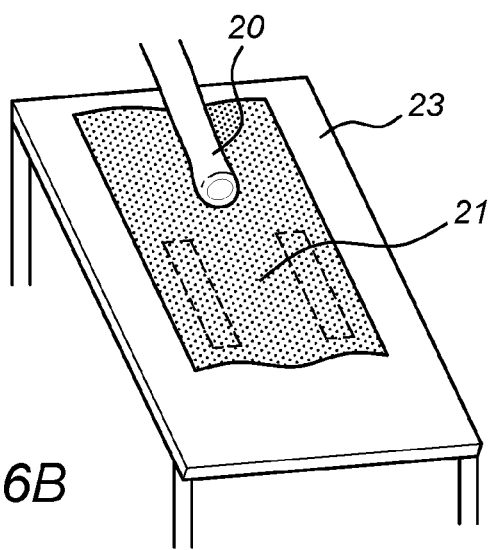
Figure 6C:
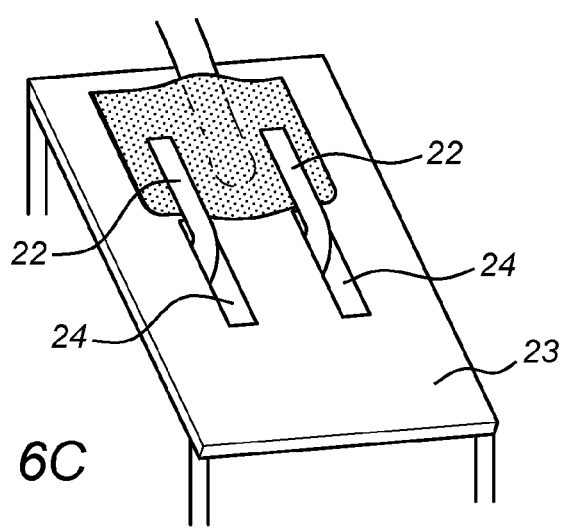

FIGS. 6A-6C show schematic views of successive steps of an alternative for enclosing an outer end of the rectum 20 with a sheet of covering material 21 wherein arms 22 are used for automatic folding the sheet of covering material 21 around the outer end of the rectum 20. In FIG. 6A is depicted that a sheet of covering material carrier 23 is provided with two apertures 24. In FIG. 6B the outer end of the rectum 20 is placed onto the sheet of covering material 21 that has been brought onto the sheet of covering material carrier 23. Now in FIG. 6C is shown that arm 22 are moved through the apertures 24 such that the sheet of covering material 21 is folded around the outer end of the rectum 20.

Figure 7A:
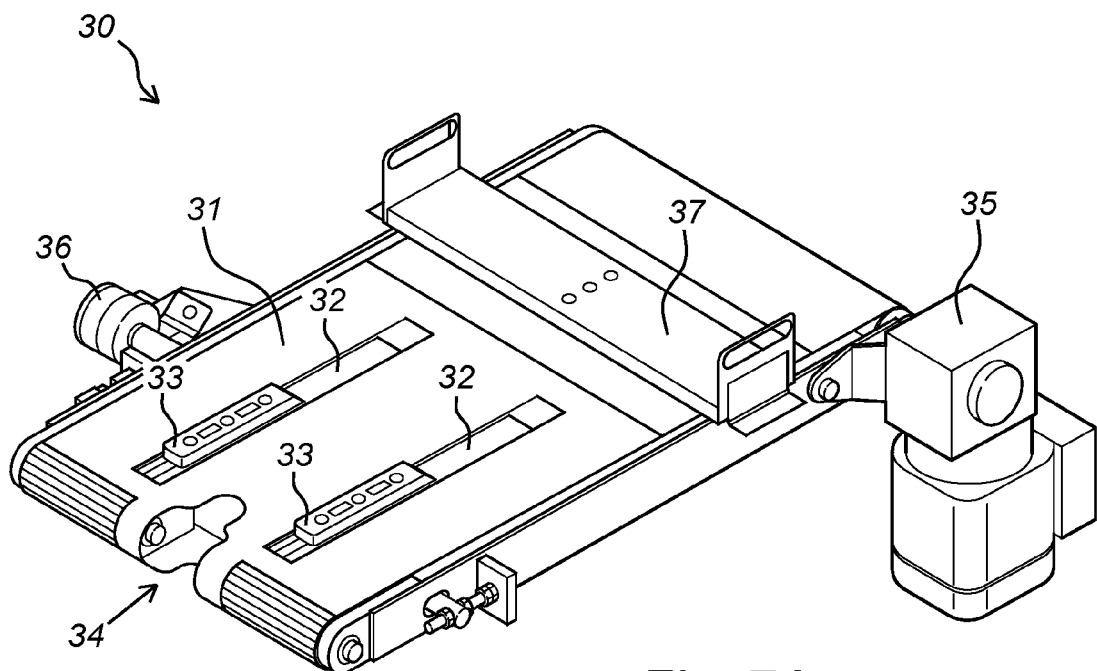
FIGS. 7A and 7B perspective views on an embodiment of an sheet of covering material carrier as part of an embodiment of the device for detaching and enclosing an outer end of the rectum of a carcass according the present invention.
Figure 7B:
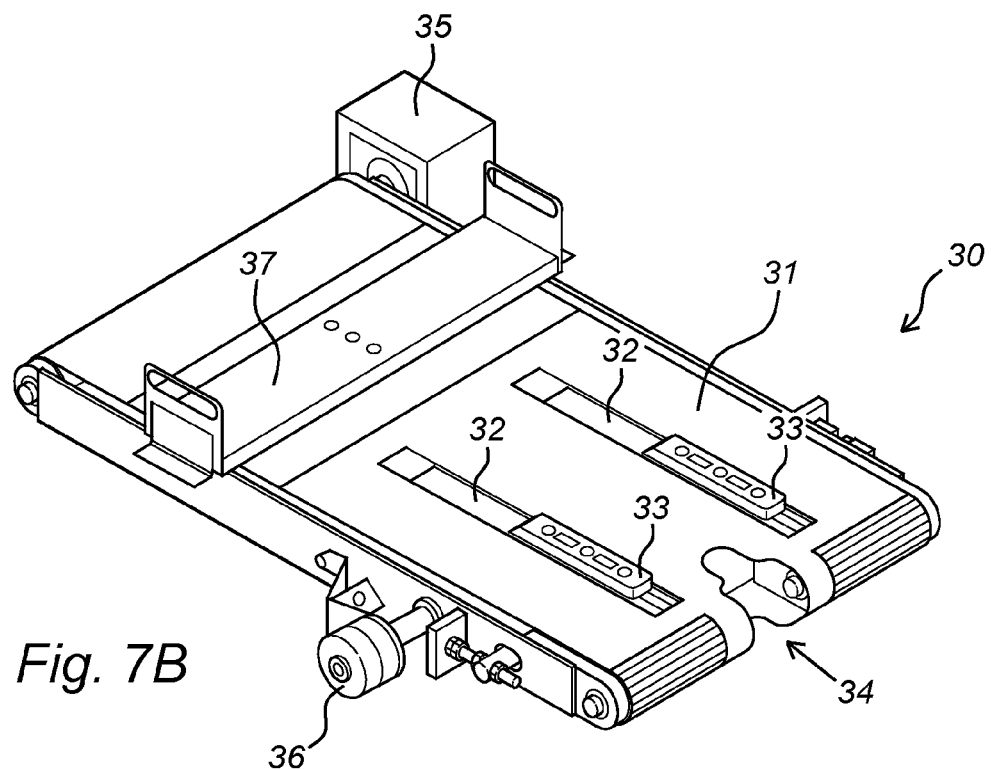

In FIGS. 7A and 7B perspective views on a further alternative sheet of covering material carrier 30 is shown wherein and endless conveyor belt 31 with apertures 32 for folding arms 33 are shown. It must be clear that it is important that the relative orientation of the endless conveyor belt 31 to the folding arms 33 has to be controlled; only with the correct relative allocation the arms 33 are able to pass through the apertures 32. Also visible in FIG. 7A is a catch 34 for the outer end of a rectum. Furthermore the sheet of covering material carrier 30 comprises a conveyor belt drive 35 and a folding drive 36 for the arms 34. Yet another feature is a sheet of covering material cutter 37 located above the endless conveyor belt 31. The sheet of covering material cutter 37 may use under-pressure to suck the sheet of covering material towards the sheet of covering material cutter 37. In the sheet of covering material cutter 37 a heated wire may be provided (not visible here) that cuts the sheet of covering material as soon as the under-pressure brings the sheet of covering material into contact with the heated wire. With such a sheet of covering material cutter 37 the portioning of the sheet of covering material pieces to be used may be mechanised/automated.

The invention claimed is:

1. A method for detaching and enclosing an outer end of the rectum of a carcass, comprising the processing steps of:
   A) releasing the outer end of the rectum;
   B) pulling the released outer end of the rectum out of the carcass;
   C) placing the pulled out outer end of the rectum onto a sheet of covering material; and
   D) positioning the sheet of covering material around the pulled out outer end of the rectum such that the sheet of covering material encloses the outer end of the rectum.

2. The method according to claim 1, wherein the sheet of covering material is secured in the out outer end of the rectum enclosing position.

3. The method according to claims 2, wherein the sheet of covering material is secured in the out outer end of the rectum enclosing position by sealing the sheet of covering material.

4. The method according to claim 1, wherein the sheet of covering material comprises a synthetic material, for instance a polyethylene.

5. The method according to claim 1, wherein prior to the processing step C) the pubic bone is cleaved and the belly is opened, and that during processing step C) the outer end of the rectum is brought in contact with the sheet of covering material at the belly side of the carcass.

6. The method according to claim 1, wherein the outer end of the rectum is brought in contact with the sheet of covering material at a side of the carcass close to where the anal orifice is located.

7. The method according to claim 1, wherein the sheet of covering material is supplied onto a carrier close to the carcass and that during processing step C) the outer end of the rectum is placed on the sheet of covering material supported by the carrier.

8. The method according to claim 7, wherein after placing the outer end of the rectum on the sheet of covering material the outer end of the rectum is caught by the carrier such that the sheet of covering material is positioned around the pulled out outer end of the rectum by the carrier.

9. The method according to claim 1, wherein the sheet of covering material is applied around the outer end of the rectum by folding the sheet of covering material around the outer end of the rectum.

10. A device for detaching and enclosing an outer end of the rectum of a carcass, comprising:
   a conveyor for carcasses defining a carcass transport path;
   a tool for releasing the outer end of the rectum of the carcass; and
   pull-out means for pulling the released outer end of the rectum from the carcass;
   wherein the device also comprises a sheet of covering material feed and compression means for enclosing the pulled out outer end of the rectum by at least one sheet of covering material.

11. The device according to claim 10, wherein the device also comprises a sheet of covering material carrier located adjacent the carcass transport path, which sheet of covering material carrier is connected with the sheet of covering material feed.

12. The device according to claim 11, wherein the sheet of covering material carrier is provided with a catch for the outer end of the rectum.

13. The device according to claim 11, wherein the sheet of covering material carrier is provided with an endless sheet of covering material feed conveyor.

14. The device according to claim 13, wherein the endless conveyor of the sheet of covering material carrier has a transport direction towards the carcass transport path.

15. The device according to claim 11, wherein the sheet of covering material carrier is provided with at least one folding arm.

16. The device according to claim 15, wherein the sheet of covering material feed is provided with a separator for separating individual sheets of covering material from a covering material buffer.

\* \* \* \* \*